Figure 5:
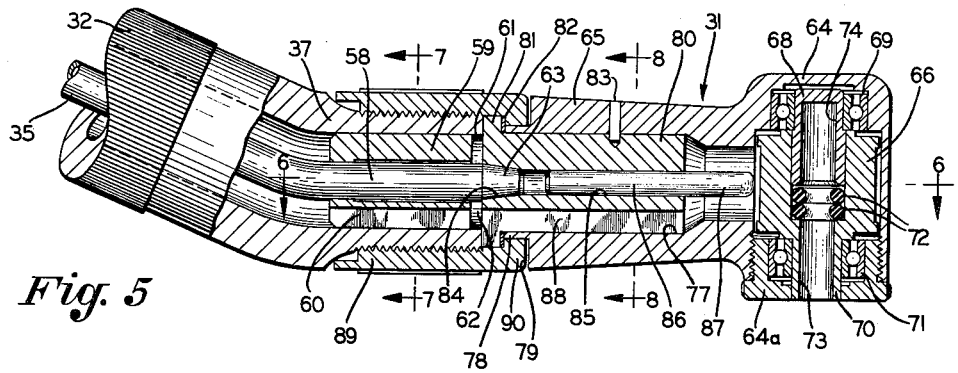

Nov. 21, 1961  M. W. HELM ET AL  3,009,249
FLUID-DRIVEN DENTAL HANDPIECE CONSTRUCTION
Filed Oct. 25, 1956  4 Sheets-Sheet 1
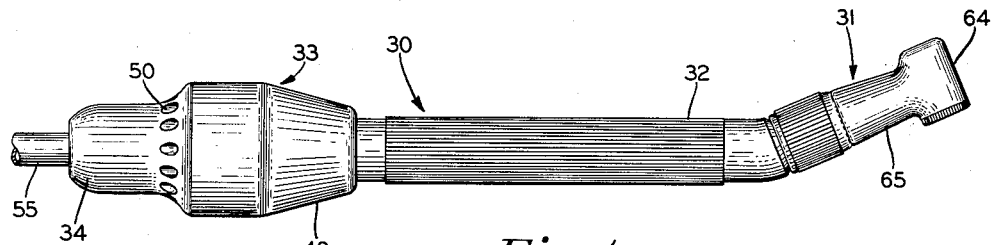
Fig. 1
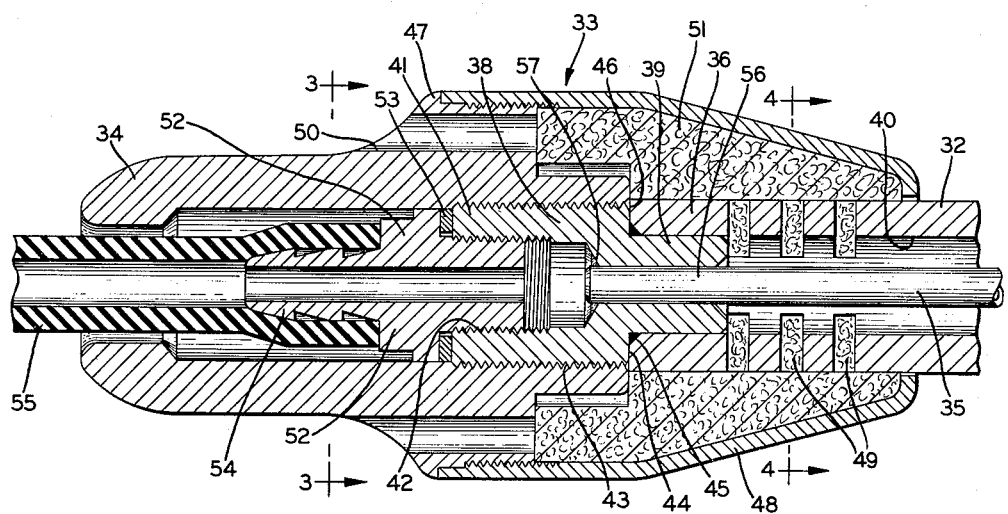
Fig. 2
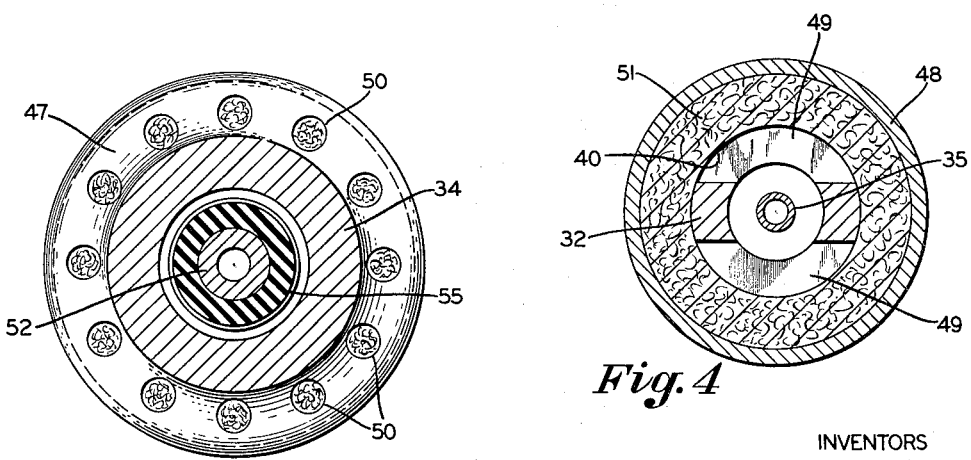
Fig. 3
Fig. 4
INVENTORS
MARK W. HELM,
JOHN A. MAURER and
JOHN J. LUZIO
BY *Frease & Bishop*
ATTORNEYS INVENTORS
MARK W. HELM,
JOHN A. MAURER and
JOHN J. LUZIO
BY *Frease & Bishop*
ATTORNEYS Nov. 21, 1961   M. W. HELM ET AL   3,009,249
FLUID-DRIVEN DENTAL HANDPIECE CONSTRUCTION
Filed Oct. 25, 1956   4 Sheets-Sheet 3

INVENTORS
MARK W. HELM,
JOHN A. MAURER and
JOHN J. LUZIO
BY
Frease & Bishop
ATTORNEYS Nov. 21, 1961　　　M. W. HELM ET AL　　　3,009,249
FLUID-DRIVEN DENTAL HANDPIECE CONSTRUCTION
Filed Oct. 25, 1956　　　　　　　　　　　　4 Sheets-Sheet 4

INVENTORS
MARK W. HELM,
JOHN A. MAURER and
JOHN J. LUZIO
BY
Freese & Bishop
ATTORNEYS

United States Patent Office 3,009,249
Patented Nov. 21, 1961

3,009,249
FLUID-DRIVEN DENTAL HANDPIECE
CONSTRUCTION
Mark W. Helm and John A. Maurer, Canton, Ohio, and
John J. Luzio, Glendora, Calif., assignors to The Weber
Dental Manufacturing Company, Canton, Ohio, a corporation of Ohio
Filed Oct. 25, 1956, Ser. No. 618,325
15 Claims. (Cl. 32—27)

Our invention relates generally to improvements in fluid-driven handpiece construction and more specifically to a preferably air-driven turbine type dental handpiece.

Certain prior constructions of turbine type dental handpieces have been provided with the turbine positioned at the rearward end of the handpiece, that is, the end opposite that end containing the burr-holding device. In these prior constructions the turbine is connected through a shaft and a series of gears, contained within the handpiece handle, to the burr-holding device, so that rotation of the turbine by impinging fluid such as air against the buckets or veins thereof causes rotation of the burr-holding device and, consequently, the dental burr.

Further, in these prior constructions, where the fluid used to drive or rotate the turbine is air, the air, after striking the turbine, is usually exhausted directly through a series of holes in the handpiece handle to the outside atmosphere. Thus, one of the more serious objections to these prior constructions is that no muffling or deadening of the sounds created by the air striking the turbine and created by the air exhausting from the handpiece is provided, thereby creating an objectionable amount of noise.

A still further difficulty is that, because of the shafts and gearing required between the turbine and the burr-holding device, which must necessarily be journaled in and extend substantially the entire length of the handpiece, these prior dental handpiece constructions are expensive to manufacture and maintain. Finally, unless these shafts and gearing are very precisely formed and mounted within the handpiece, an objectionable amount of vibration can result, particularly where a modern high-speed dental handpiece is desired.

Other prior constructions of turbine type dental handpieces have been provided with the fluid-driven turbine mounted at the burr-holding end of the handpiece and usually directly overlying or surrounding the burr-holding device. In most of these constructions, however, against where air is the fluid used to drive the turbine, this air is still exhausted almost directly from the turbine through a series of holes to the outside atmosphere.

Thus, in these prior constructions, not only is the problem of noise still prevalent, but also this exhausting of air directly from the turbine outward of the handpiece results in this exhaust air being ejected into the mouth of the patient upon whom the handpiece is being used. Further, the turbine being positioned in the head end or end of the handpiece containing the burr-holding device has resulted in this head end being of considerable size and bulky, which is highly objectionable because this head end must be inserted into the patient's mouth in order to use the handpiece on the patient's teeth.

A still further difficulty with these prior handpiece constructions has resulted from the fact that these constructions have been provided with straight handles with the burr-holding device positioning the dental burr to extend at right angles to the longitudinal axis of the handle. With this straight handle construction it is extremely difficulty to reach certain portions of the patient's teeth with the rotating dental burr.

Thus, it is desirable to provide a turbine type dental handpiece in which the turbine is positioned at the head end of the handpiece, but yet the size of this head end must be maintained small enough for convenient use and insertion in the patient's mouth. Further, it is desirable to maintain this reduced size while still providing a quiet operating handpiece and one in which the exhaust air is removed from the area of the patient's mouth and is exhausted at a point remote therefrom.

It becomes a problem, however, to provide a dental handpiece of convenient and practical size which includes the necessary sound deadening or muffling means for reducing objectionable noises. Further, in order to remove the exhaust air from the turbine and direct it rearwardly through the dental handpiece to a point remote from the patient's mouth before exhausting the same, the problem of providing passages through the handpiece for accomplishing the transmission of this exhaust air again creates a problem of size and bulkiness of the assembled handpiece.

Finally, it is desirable to provide a dental handpiece in which the head portion thereof containing the burr-holding device is angled in reference to the handle portion or remainder of the handpiece and also so that this angled head portion is selectively rotatable in reference to the handle portion, thereby providing infinitely greater accessibility to the patient's teeth of the dental burr. Where the turbine is positioned in the head end of the handpiece, however, the provision of this angled rotatable head portion presents the problem of transmitting an air or fluid supply through the handle portion and to the head portion while still maintaining the head portion selectively rotatable in reference to the handle portion.

It is, therefore, a general object of the present invention to provide a fluid-driven dental handpiece construction which overcomes the objections of the prior constructions and solves the before-mentioned problems normally encountered with the provision of certain desirable features therein.

It is a primary object of the present invention to provide a fluid-driven dental handpiece construction in which the fluid-driven turbine is positioned at the end of the handpiece in which the burr-holding device is located.

It is a further object of the present invention to provide a fluid-driven dental handpiece construction in which the exhaust fluid, preferably air, is removed to a point remote from the patient's mouth before being exhausted from the handpiece.

It is still a further object of the present invention to provide a fluid-driven dental handpiece construction in which the exhaust of the air from the handpiece is muffled, thereby greatly decreasing the noise normally created.

It is an additional object of the present invention to provide a fluid-driven dental handpiece construction in which the fluid-driven turbine is formed in such a way as to eliminate the greater portion of the noise normally created in air turbines.

It is another object of the present invention to provide a fluid-driven dental handpiece construction in which the head portion thereof containing the turbine and burr-holding device is angled and is rotatable in relation to the handle portion to provide more convenient and greater accessibility to all of the teeth in the patient's mouth, yet an efficient means is provided for supplying fluid, such as air, through the handle portion to the turbine in the head portion.

It is still another object of the present invention to provide a fluid-driven dental handpiece construction in which the head portion is angled and rotatable in relation to the handle portion and the head portion may be selectively and securely placed and maintained in any one of a series of positions in reference to the handle portion.

It is also an object of the present invention to provide a fluid-driven dental handpiece construction in which cooling means is provided for the dental burr.

Finally, it is an object of the present invention to provide a fluid-driven dental handpiece which satisfies all of the above objects, yet is of a minimum size, is simple and relatively economical to manufacture and is constructed for convenience of assembly.

These and other objects are accomplished by the parts, constructions, arrangements, combinations and subcombinations comprising the present invention, the nature of which is set forth in the following general statement, preferred embodiments of which—illustrative of the best mode in which applicants have contemplated applying the principles—are set forth in the following description and illustrated in the accompanying drawings, and which are particularly and distinctly pointed out and set forth in the appended claims forming a part hereof.

In general terms, the improved fluid-driven dental handpiece construction comprising the present invention may be stated as including a handle assembly and a head assembly. The handle assembly is preferably comprised of an air supply means, an air exhaust means and a muffler means.

The head assembly is preferably comprised of an air supply nozzle means, turbine means, burr-holding means and air exhaust means. The head nozzle means is connected to the handle air supply means for providing air under pressure to the turbine means rotating the turbine means and the burr-holding means which is connected to the turbine means.

The head air exhaust means receives the exhaust air from the turbine means, directing it into the handle exhaust means from which the exhaust air is directed into the muffler means. Finally, the muffler means exhausts the air into the outside atmosphere.

The handle assembly is preferably connected to the head assembly by means permitting selective rotation of the head assembly in reference to the handle assembly and this means may include indexing means securely retaining the head and handle assembly in any particular selected position of rotation in reference to each other. Further, sealing means is provided between the handle air supply means and head nozzle means and also between the head and handle air exhaust means for preventing air from leaking from these various means at their points of connection.

Still further, the construction may include burr-cooling means preferably connected to the head air exhaust means for directing a jet of air under pressure against the burr retained in and rotated by the burr-holding means.

Finally, the turbine means and handle air supply means may be constructed to provide sound deadening qualities to the handpiece and reduce the noise caused by the air under pressure circulating through the handpiece and rotating the turbine means, with this construction also permitting a somewhat simplified handle assembly.

Figure 6:
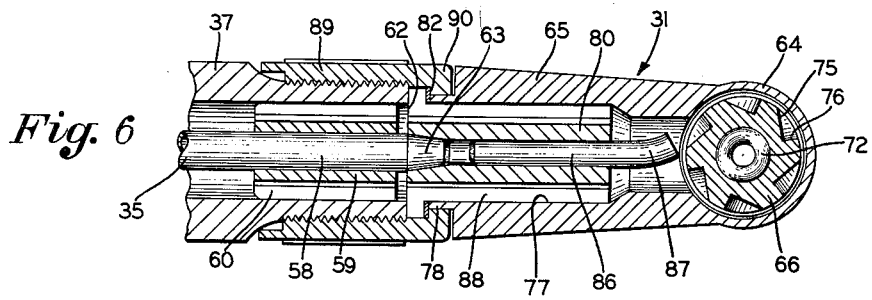
Figure 9:
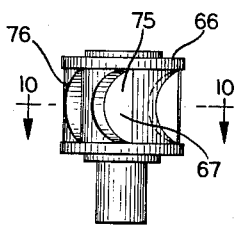
Figure 7:
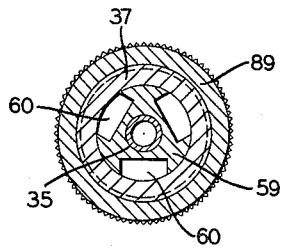
Figure 8:
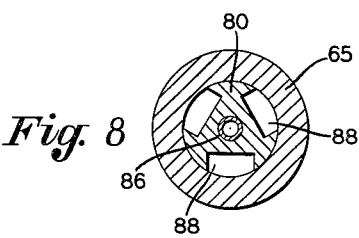
Figure 10:
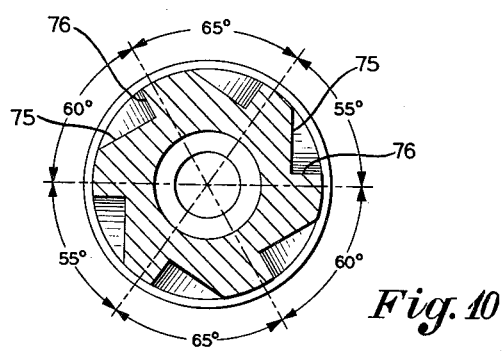
Figure 11:
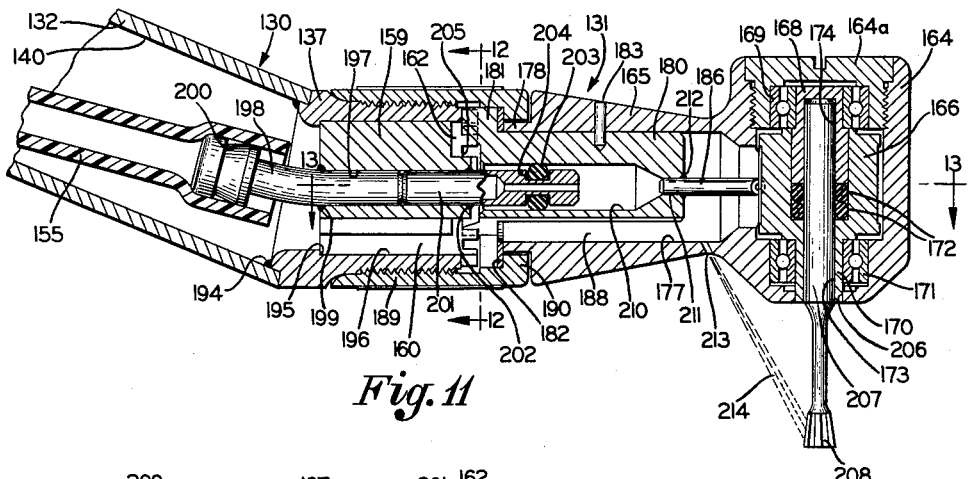
Figures 12, 13:
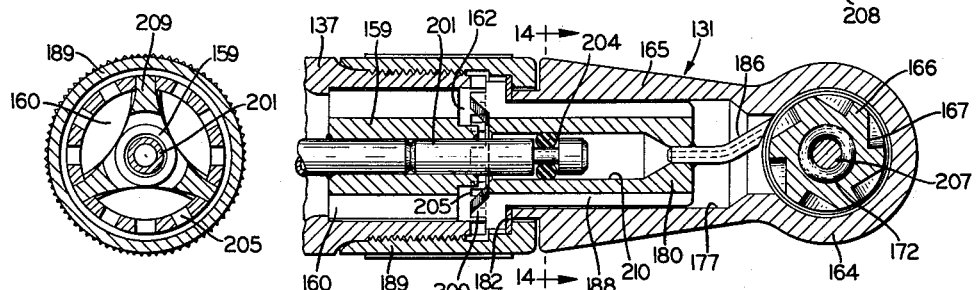
Figures 14, 15, 16:
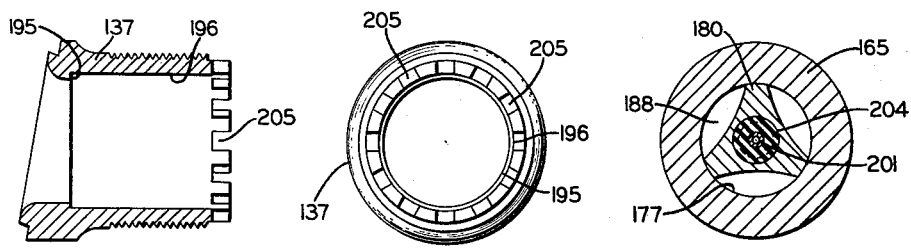
Figures 17, 18:
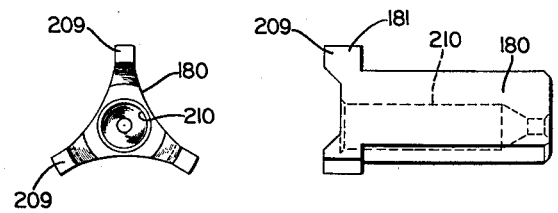
Figure 19:
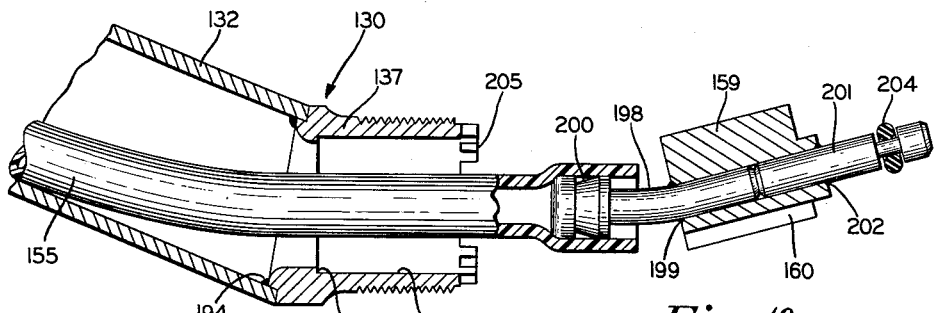
Figure 20:
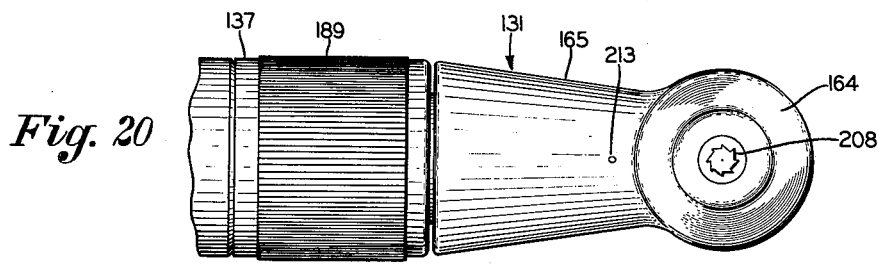
Figure 21:
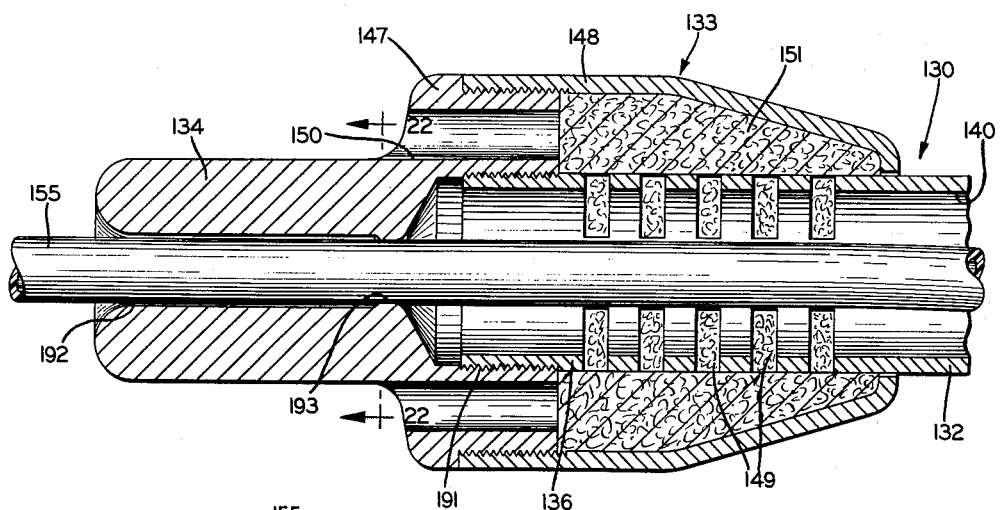
Figure 22:
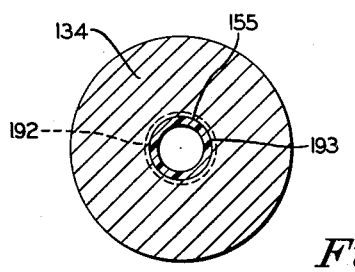

By way of example, an embodiment of the improved fluid-driven dental handpiece construction of the present invention is illustrated in the accompanying drawings forming a part hereof, wherein like numerals indicate similar parts throughout the several views, and in which:

FIG. 1 is a side elevational view of a first embodiment of the fluid-driven dental handpiece construction comprising the present invention;

FIG. 2, a fragmentary sectional view, part in elevation, of the rearward portion of the dental handpiece of FIG. 1;

FIG. 3, a sectional view, part in elevation, looking in the direction of the arrows 3—3 in FIG. 2;

FIG. 4, a sectional view, part in elevation, looking in the direction of the arrows 4—4 in FIG. 2;

FIG. 5, a fragmentary vertical sectional view, part in elevation, of the forward end of the handpiece shown in FIG. 1;

FIG. 6, a fragmetary horizontal sectional view, part in elevation, looking in the direction of the arrows 6—6 in FIG. 5;

FIG.7, a sectional view looking in the direction of the arrows 7—7 in FIG. 5;

FIG. 8, a sectional view looking in the direction of the arrows 8—8 in FIG. 5;

FIG. 9, a side elevation of the turbine means removed from the dental handpiece construction shown in FIG. 1;

FIG. 10, a sectional view, part in elevation, looking in the direction of the arrows 10—10 in FIG. 9;

FIG. 11, a fragmentary vertical sectional view, part in elevation, of the forward portion of a second embodiment of the fluid-driven dental handpiece construction comprising the present invention;

FIG. 12, a sectional view, part in elevation, looking in the direction of the arrow 12—12 in FIG. 11;

FIG. 13, a fragmentary horizontal sectional view, part in elevation, looking in the direction of the arrows 13—13 of FIG. 11;

FIG. 14, a sectional view looking in the direction of arrows 14—14 in FIG. 13;

FIG. 15, a vertical sectional view of the forward end of the handle assembly removed;

FIG. 16, an end view of the end portion shown in FIG. 15;

FIG. 17, a side elevation of the nozzle holder removed from the dental handpiece construction shown in FIG. 11;

FIG. 18, an end view of the nozzle holder of FIG. 17;

FIG. 19, a fragmentary vertical sectional view, part in elevation, showing the assembly of the forward portion of the handle assembly of the dental handpiece of FIG. 11;

FIG. 20, a view looking at the underside of the head assembly of the dental handpiece shown in FIG. 11;

FIG. 21, a fragmentary vertical sectional view, part in elevation, of the rearward portion of the handle assembly of the dental handpiece shown in FIG. 11; and FIG. 22, a sectional view looking in the direction of the arrows 22—22 in FIG. 21.

The first embodiment fluid-driven dental handpiece construction comprising the present invention includes a handle assembly generally indicated at 30 and a head assembly generally indicated at 31. The handle assembly 30 preferably includes a handle 32, a muffler assembly generally indicated at 33, a hose guard 34 and an air supply pipe 35.

Handle 32 is preferably hollow cylindrical in configuration and is formed straight from its rearward end portion 36, shown in FIG. 2, to a point spaced from its forward end, where it is formed into an angled forward end portion 37, as shown in FIG. 5. Referring to FIG. 2, a generally hollow cylindrical supply pipe holder 38 is received partially telescoped within the handle rearward end portion 36, with this pipe holder being comprised of a small diameter portion 39, received in the bore 40 of handle 32, and a large diameter portion 41, extending rearwardly from the handle rearward end portion 36.

The pipe holder large diameter portion 41 is provided with internal threads 42 and external threads 43 and the shoulder 44 formed between large diameter portion 41 and small diameter portion 39 is positioned abutting the extreme rearward end of handle 32. Pipe holder 38 and handle 32 are retained in assembled position preferably by soldering, as shown at 45.

Hose guard 34 is also hollow cylindrical in configuration and is received partially telescoped over the large diameter portion 41 of pipe holder 38 being threadably engaged with the external threads 43 of this pipe holder portion. The forward end of hose guard 34 is positioned partially abutting the rearward end of handle 32, as at 46.

Hose guard 34 is further provided with an outwardly extending flange portion 47, spaced rearwardly from the rearward end of handle 32 and extending outwardly from the outer circumference of the handle. Muffler housing 48 of muffler assembly 33, also being generally hollow cylindrical, is received telescoped over the rearward end portion 36 of handle 32, with this muffler housing extending rearwardly and being telescoped over and threadably engaged with the flange portion 47 of hose guard 34.

Further, a series of longitudinally spaced openings in the form of slots 49 are formed through the handle 32 at the rearward end portion 36 so that these slots are positioned rearwardly of the forward end of muffler housing 48. Also, a series of circumferentially spaced longitudinally extending holes 50 are formed through the flange portion 47 of hose guard 34 inwardly of muffler housing 48. Finally, muffling material 51, such as spun fiber glass impregnated with globules of an elastic resilient material such as rubber, is packed within muffler housing 48 between this housing and handle 32 and hose guard 34.

Thus, continuous restricted passages are formed from within the inner confines of handle 32 through slots 49 through the muffling material 51 and through holes 50 in hose guard 34 to the outer atmosphere. Further, sounds created by movement of air through this passage as well as sound created by the movement of air through other parts of the dental handpiece are greatly diminished or deadened by the muffling material 51.

Hose nipple 52 is received telescoped totally within hose guard 34 with a forward portion thereof being telescoped within the large diameter portion 41 of pipe holder 38 and threadably engaged with the internal threads 42. Further, a sealing washer 53 is preferably positioned between nipple 52 and the extreme rearward end of pipe holder 38 to prevent any leakage of air under pressure between the pipe holder and nipple.

The rearward end portion of nipple 52 is provided with the usual hose engaging notches or serrations 54. Thus, a plastic or rubber air supply hose 55 may be telescoped within the rearward end of hose guard 34 and expanded and telescoped over the rearward end portion of nipple 52 with the hose being retained in air-tight connection by the serrations 54, as shown in FIG. 2.

Air supply pipe 35 is positioned telescoped within handle 32 and extending substantially coaxially therewith, with the rearward end portion 56 of this pipe being positioned telescoped within the small diameter portion 39 of pipe holder 38 and retained therein preferably by soldering, as at 57. Pipe 35 is preferably formed of metal, such as stainless steel, for a purpose to be hereinafter described.

Thus, an air supply passage is formed at the rearward end of the dental handpiece construction from air supply hose 55 through nipple 52, through a portion of pipe holder 38 and through supply pipe 35 within handle 32. Further, this is a completely separate passage from the passage described above which is through handle 32 outward of supply pipe 35, into muffler 33 and into the outer atmosphere through the flange portion 47 of hose guard 34.

Referring to FIG. 5, air supply pipe 35 extends forwardly through handle 32, remaining substantially coaxial therewith and, therefore, being provided with an angled forward end portion 58 within and substantially coaxial with the handle angled forward end portion 37. Pipe spacer 59 is received telescoped within the forward end portion 37 of handle 32 and receives the forward end portion 58 of air supply pipe 35 telescoped therethrough and extending forwardly therefrom.

Further, pipe spacer 59, as shown in FIG. 7, is provided with preferably three radially spaced slots 60 formed in the outer circumference thereof outward of air supply pipe 35 and extending the complete longitudinal length of pipe spacer 59. Pipe spacer 59 may be received in handle 32 by a press fit or may be soldered as at 61, while the forward end portion 58 of air supply pipe 35 is received through spacer 59 by means of a slip fit. In this manner spacer 59 will maintain pipe 35 substantially coaxial of handle 32, but yet the forward end portion 59 of pipe 35 may move longitudinally of spacer 59, again for a purpose to be later described.

The forward end of spacer 59 terminates a short distance from the forward end of handle 32, providing a space 62 within handle 32 and around pipe 35. Further, the forward end 58 of pipe 35 terminates outwardly of the forward end of handle 32 in an inwardly tapered end portion 63.

Head assembly 31 includes a rotor housing portion 64 and a handle connecting portion 65. Handle connecting portion 65 is generally hollow cylindrical, opening toward handle assembly 30 and toward rotor housing portion 64, while rotor housing portion 64 is also generally hollow cylindrical but with the axis thereof extending at right angles to the axis of handle connecting portion 65 and handle forward end portion 37.

Further, rotor housing portion 64 is closed at its top end and open at its lower end with this lower opening communicating through the side of the rotor housing portion with the opening in handle portion 65. Rotor 66 is received journaled within the rotor housing portion 64 and is provided with a series of circumferentially spaced turbine buckets 67 in the outer circumference thereof in alignment with the forward end of handle connecting portion 65.

Rotor 66 is journaled in rotor housing 64 by means of a stub shaft 68 received telescoped axially within the upper portion of rotor 66 and extending therefrom into a micro bearing 69 which is mounted in the rotor housing 64. Further, a burr holder 70 is preferably formed integral with rotor 66 and extends axially downwardly therefrom, with this burr holder being received through a micro bearing 71 which is mounted in a cap 64a threadably received in the lower end of rotor housing 64.

A pair of O-rings 72 are positioned within rotor 66 beneath the lower end of stub shaft 68 and above burr holder 70, with these O-rings being formed so that they extend to a smaller diameter than the diameter of bore 73 of burr holder 70 and bore 74 of stub shaft 68, which bores 73 and 74 are in axial alignment and of substantially equal diameter.

Thus, rotor 66 is mounted rotatable in reference to rotor housing portion 64 by means of the micro bearings 69 and 71. Further, a usual dental burr, not shown, may be inserted within bore 73 of burr holder 70, through O-rings 72 and into bore 74 of stub shaft 68, and upon rotation of rotor 66, this dental burr will be rotated through the O-rings 72 which are formed of a diameter to firmly engage the outer periphery of the dental burr.

Referring to FIGS. 9 and 10, the rotor buckets 67 are formed at spaced intervals in the outer circumference of rotor 66. Each bucket 67 is preferably formed with a generally flat bottom surface 75, extending substantially parallel to a plane tangential to the outer circumferential surface of rotor 66, with the end surface 76 of each bucket extending substantially at right angles to surface 75.

Further, end surfaces 76 preferably extend in an arcuate plane with the end portions thereof blending into and meeting the rotor outer circumference substantially at the point of beginning of the bottom surfaces 75. Thus, as shown in FIG. 9, from top view, buckets 67 form a half moon pattern beginning at the outer circumferential surface of rotor 66 and increasing in depth to their arcuate end surfaces 76.

Still further, when rotor 66 is mounted journaled in rotor housing portion 64, these buckets 67 are substantially closed at the outer circumference of rotor 66 by this rotor housing portion, except where the opening in the rotor housing portion communicates with the opening extending through the handle connecting portion 65, as shown in FIG. 5. Finally, for purposes of decreased noise, it is preferable that the buckets 67 are formed spaced at uneven intervals around the outer circumference of rotor 66, rather than being uniformly spaced, with this uneven spacing being illustrated in FIG. 10 and hereinafter more fully described.

As before described, handle connecting portion 65 is provided with an opening extending longitudinally therethrough and communicating with the opening of rotor housing portion 64, this opening through portion 65 being formed by a bore 77 as shown in FIGS. 5 and 6. Further, bore 77 opens toward handle 32 with connecting portion 65 terminating at this point in a longitudinally extending flange 78, which flange extends continuously around the end of connecting portion 65 and forms a radially extending shoulder 79.

Nozzle holder 80 is formed generally cylindrical and is received telescoped within bore 77 of connecting portion 65 extending into bore 77 to a point spaced from rotor housing portion 64 and consequently spaced from the outer circumference of rotor 66. Further, nozzle holder 80 extends from bore 77 of connecting portion 65 in a direction toward handle 32, and between handle 32 and flange 78 of connecting portion 65, the nozzle holder is provided with a radially outwardly extending flange 81 extending radially outwardly beyond flange 78 of portion 65.

A sealing washer 82 is positioned between the end of flange 78 of portion 65 and flange 81 of nozzle holder 80 with this washer preferably extending the complete radial length of flange 81. Also, nozzle holder 80 may be secured positioned in bore 77 of portion 65 preferably by means of a pin 83 extending through the outer wall of portion 65 and into holder 80, with such positioning preferably compressing sealing washer 82 between flange 78 of portion 65 and flange 81 of holder 80.

Nozzle holder 80 is provided with a bore extending longitudinally therethrough and centrally thereof, comprising an inwardly tapered bore 84 extending from the end of holder 80 toward handle 32, with this bore terminating inwardly in a smaller diameter substantially cylindrical bore 85. Bore 85 opens into bore 77 of portion 65 at the end of holder 80 toward rotor housing portion 64, and at a point spaced from rotor 66.

Tapered bore 84 is formed slightly larger than the tapered end portion 63 on the forward end portion 58 of air supply pipe 35 in handle 32 for a purpose to be hereinafter described. Further, the axial length of bore 84 is preferably slightly greater than the length of tapered end portion 63.

Nozzle 86 is telescoped within bore 85 of holder 80 and extends from the end of holder 80 toward rotor housing portion 64 in an arcuate end portion 87 which terminates adjacent rotor 66. As shown in FIG. 6, nozzle 86 is positioned so that the arcuate end portion 87 will direct air passing through nozzle 86 in a line substantially parallel to the bottom surfaces 75 of rotor buckets 67 and against end surfaces 76 thereof.

Finally, nozzle holder 80 is provided with a series of circumferentially spaced longitudinally extending slots 88 in the outer circumferential surface thereof, spaced outwardly from bores 84 and 85 and extending the entire length of holder 80. Thus, these slots 88 will form a communication between bore 77 of portion 65 adjacent the end of holder 80 toward rotor 66, through the open end of portion 65 toward handle 32.

A collar or nut 89 is received telescoped over flange 78 of portion 65 abutting shoulder 79. Further, collar 89 is provided with a radially inwardly extending flange 90 engaged with flange 81 of holder 80 and washer 82.

The axial distance between washer 82 and shoulder 79 of portion 65 is slightly greater than the axial length of flange 90 of this collar. Thus, collar 89 is engaged with and surrounds the outer circumference of flange 81 formed on holder 80, so that this collar is rotatable in reference to portion 65 and holder 80, but may move only a slight distance axially of this portion and holder.

In assembled position, as shown in FIGS. 5 and 6, the forward end portion 37 of handle 32 is telescoped within collar 89 and is threadably engaged therewith, abutting the end of handle 32 against nozzle holder 80. At the same time the tapered end portion 63 of air supply line 35 is received in the tapered bore 84 of nozzle holder 80.

This drawing up of collar 89 on the end portion 37 of holder 32, until the end portion abuts the nozzle holder 80, causes the sealing washer 82 to be compressed between the flange 90 of collar 89 and the flange 81 of holder 80, thereby forming an air-tight seal at this point, even though collar 89 is rotatable for completing this connection and assembly. Further, air supply pipe 35 is preferably formed of a slightly greater length than is necessary to extend through handle 32 and into bore 84 of holder 80, so that as this assembly is made, pipe 35, due to being metal, may be slightly flexed, with the pipe sliding slightly rearwardly through pipe spacer 59, thereby creating a slight compressive force between the pipe tapered end portion 63 and tapered bore 84. In this manner an air-tight seal is formed between pipe 35 and the bore of holder 80.

Thus, an air-tight passage is formed within pipe 35 through holder 80 and opening at the end of nozzle 86 adjacent rotor 66. Further, an air-tight passage is formed from rotor 66 around the end portion 87 of nozzle 86, through slots 88 of nozzle holder 80 and the space 62 adjacent pipe spacer 59, through slots 60 of this pipe spacer, and into the bore 40 of handle 32 outwardly of pipe 35.

In the operation of the fluid driven dental handpiece comprising the present invention, referring to FIGS. 2, 5 and 6, air under pressure enters through air supply hose 55, passing through hose nipple 52, supply pipe holder 38 and into air supply pipe 35. This air is transmitted the entire length of handle 32 through air supply pipe 35, where it is directed through tapered end portion 63 into nozzle holder 80.

Within nozzle holder 80 the air passes into nozzle 86 and is directed from the arcuate end portion 87 thereof against rotor 66. This air strikes the end surfaces 76 of the rotor buckets 67, causing the rotor to rotate and consequently rotate a dental burr positioned in the burr holder 70.

The air is exhausted from the bucket 67 of rotor 66 into the bore 77 of the head assembly handle connection portion 65 around the nozzle arcuate end portion 87. Thereafter, this exhausted air passes through slots 88 formed in nozzle holder 80 into the space 62 formed at the forward end of holder 32 between pipe spacer 59 and nozzle holder 80.

The air then passes through slots 60 in pipe spacer 59 and into the bore 40 of handle 32 around air supply pipe 35. This exhaust air flows the entire length of handle 32 toward the rearward end thereof within bore 40 and around pipe 35, and at the rearward end of handle 32 the air passes through slots 49 into muffler assembly 33.

Within muffler assembly 33 this exhaust air is filtered around and through the muffling material 51 contained within muffler housing 48 and ultimately arrives at the holes 50 formed in the hose guard flange portion 47. Finally, the air passes through holes 50 and is exhausted into the outside atmosphere.

Thus, an air-tight air supply passage to rotor 66, mounted at the extreme forward end of the dental handpiece, is provided by hose nipple 52, supply pipe holder 38, supply pipe 35, nozzle holder 80 and nozzle 86. Further, an air-tight air exhaust passage from rotor 66 to a point remote from the mouth of the patient upon which the dental handpiece is being used is provided by bore 77 in head assembly handle connecting portion 65, slots 88 in nozzle holder 80, space 62 between nozzle holder 80 and pipe spacer 59, slots 60 in pipe spacer 69, bore 40 in handle 32 outward of supply pipe 35, slots 49 in handle 32, muffler assembly 33 and air exhaust holes 50 in hose guard 34.

In other words, an air-tight passage for a supply of air under pressure is provided from the rearward end of the dental handpiece to the forward end thereof for rotating rotor 66 to rotate a dental burr. Further, this air supply passage is contained within and surrounded by an air exhaust passage receiving the exhaust air from rotor 66 and passing this exhaust air back substantially the entire length of the dental handpiece into a muffler means which ultimately exhausts this exhaust air into the outside atmosphere at the rearward end of the dental handpiece.

Since the air supply passage is contained within and surrounded by the air exhaust passage, it is possible to provide a dental handpiece in which the fluid used to drive the rotor, which in turn drives the dental burr, may be exhausted to a point remote from the mouth of the patient upon which the dental handpiece is being used while still providing a dental handpiece of extremely compact construction with minimum size and weight.

Another feature of the present invention is that the head assembly 31 is angled with respect to the main portion of the handle assembly 30 and also this head assembly is rotatable with reference to the handle assembly. Further, collar 89 may be selectively loosened with respect to handle 32 to permit this rotating of head assembly 31, after which collar 89 may be tightened on handle 32 and will maintain the head assembly 31 tightly positioned with respect to handle assembly 30 because flange 90 of collar 89 forces the rearward end of nozzle holder 80 in the head assembly to tightly abut the forward end surface of handle 32.

Also, because of the space 62 between pipe holder 59 in handle 32 and nozzle holder 80 in head assembly 31, the exhaust air passage is maintained back through the dental handpiece from rotor 66, despite the particular position of head assembly 31 with reference to handle assembly 30. Even though the slots 88 in nozzle holder 80 and the slots 60 in pipe spacer 59 may be completely misaligned longitudinally, the exhaust air from rotor 66 may still pass through slots 88 into space 62 and then will pass through slots 60 into handle 32.

Additionally, because of the provision of sealing washer 82 between head assembly handle connection portion 65, flange 81 of nozzle holder 80 and flange 90 of collar 89, and also because of the particular construction and mounting of air supply pipe 35, air supply pipe tapered end portion 63 and tapered bore 84 in nozzle holder 80, the air supply and exhaust passages through the dental handpiece are maintained air-tight even though head assembly 31 may be selectively rotated with reference to handle assembly 30. Sealing washer 82 prevents the passage of exhaust air from slots 88 of nozzle holder 80 and space 60 between nozzle holder 80 and pipe spacer 59 around flange 81 of nozzle holder 80 and ultimately around flange 90 of collar 89, while the compressive forces in supply pipe 35 force supply pipe tapered end portion 63 to firmly seat in tapered bore 84 of nozzle holder 80 and prevent supply air from leaking into space 62 between nozzle holder 80 and pipe spacer 59.

Finally, it is thought that the buckets 67 in rotor 66 being spaced at uneven intervals about the outer periphery of the rotor causes interference between the various sound waves created by the air striking these buckets, thereby diminishing the ultimate audible sound waves created. Also, these sound waves are further diminished by passing through the muffling material 51 in muffler assembly 33, so that little noise is created by the air exhausting from the exhaust holes 50 in hose guard 34.

The second embodiment of the fluid-driven dental handpiece comprising the present invention is similar in many respects to the first embodiment before described and is shown in FIGS. 11 through 22. As in the first embodiment, the second embodiment includes a handle assembly, generally indicated at 130, and a head assembly, generally indicated at 131, with the handle assembly including a handle 132 and a muffler assembly, generally indicated at 133.

The hose guard 134 in this second embodiment is threadably received over the rearward end portion 136 of handle 132, as shown at 191, with this hose guard again including the outwardly flanged portion 147 having the circumferentially spaced longitudinally extending air exhaust holes 150 formed therethrough. As before, the muffler housing 148 of muffler assembly 133 is received partially threadably telescoped over flange 147 of hose guard 134.

Further, the muffler assembly 133 again includes the muffling material 151 packed within muffler housing 148 outward of handle 132. Finally, the muffler assembly 133 again communicates with the bore 140 of handle 132 through a series of slots 149 spaced longitudinally along handle 132 between hose guard 134 and the forward end of muffler housing 148.

In the second embodiment the air supply hose 155, which is formed of resilient material such as plastic or rubber, extends completely through hose guard 134 into the bore 140 of handle 132 and substantially the entire length forwardly through the handle. Further, at least one portion of the bore 192 extending longitudinally through hose guard 134 is provided with a restriction 193 extending completely around supply hose 155 and having an inner diameter only slightly larger than the outer diameter of the supply hose.

Thus, when no air under pressure is contained within supply hose 155, this hose may be moved longitudinally through hose guard 134 and handle 132, since the hose will slide through the restriction 193 in the hose guard bore 192. When, however, hose 155 contains air under pressure, this hose will expand against the restriction 193, causing an air-tight seal between hose 155 and restriction 193 and thereby preventing exhaust air from passing around the outer periphery of the hose and out through the hose guard bore 192.

Thus, as in the first embodiment, an air supply passage is formed through supply hose 155 within handle 132. Further, an air exhaust passage is formed from within handle 132 around supply hose 155, through slots 149 into muffler assembly 133, and into the outer atmosphere through the holes in the hose guard flange 147.

Referring to FIG. 11, in this second embodiment the forward end portion 137 of the handle is preferably formed separate from the remainder of the handle and, as before, is preferably angled with respect to the main portion of the handle. Further, this forward end portion 137 is preferably soldered to handle 132 as at 194.

The pipe spacer 159 is again positioned telescoped within the forward end portion 137, but is received therein by means of a slip fit and preferably abuts a shoulder 195 formed in the bore 196 of this forward end portion. Further, pipe spacer 159 again includes the series of longitudinally extending circumferentially spaced slots 160 in the outer peripheral surface thereof, with these slots being spaced outwardly from a longitudinally extending centrally located bore 197, and again communicating with a space 162 at the forward end of portion 137.

In this second embodiment the hose nipple 198 is received telescoped within pipe spacer bore 197 and extends at an angle rearwardly from pipe spacer 159 through and substantially coaxial with the handle forward end portion 137 and into the bore 140 in handle 132. Nipple 198 is mounted within pipe spacer 159, preferably by soldering, as at 199, and at the rearward end thereof is provided with an enlarged portion having the usual hose connecting notches or serrations 200.

11

The air discharge tube 201 is telescoped within the forward end of bore 197 in pipe spacer 159 and extends from the pipe spacer and the forward open end of handle portion 137. Tube 201 is secured in pipe spacer bore 197 preferably by soldering, as at 202.

A circumferential slot 203 is formed around the outer periphery of discharge tube 201 at a point spaced from the forward end thereof, and spaced forwardly from pipe spacer 159 and the forward end of handle portion 137. Further, a preferably rubber O-ring 204 is received in slot 203 and normally extends radially from the outer periphery of tube 201, this construction being for a purpose to be hereinafter described.

Also, in this second embodiment, the forward end surface of handle portion 137, that is, the end of portion 137 opening toward head assembly 131, is provided with a series of preferably uniformly circumferentially spaced longitudinally extending indexing slots 205 opening toward head assembly 131. These slots 205 are also for a purpose to be hereinafter described.

As shown in FIG. 19, because of the pipe spacer 159 being received within bore 196 of handle portion 137 by means of a slip fit, pipe spacer 159, along with hose nipple 198 and discharge tube 201, may be removed from the forward end of portion 137 when head assembly 131 is removed from handle assembly 130. Thus, in assembling air supply hose 155 with hose nipple 198, when no air under pressure is contained within hose 155, this hose may be slid forwardly through the restriction 193 in hose guard 134, so that the forward end of hose 155 extends from the forward open end of handle portion 137.

Thereafter, hose 155 may be telescoped over the serrations 200 on nipple 198 outside the forward end of handle portion 137, as shown in FIG. 19. It is only necessary then to withdraw hose 155 partially through handle 132 by grasping the hose rearwardly of hose guard 134, with this withdrawal being continued until pipe spacer 159 is again assembled in handle portion 137 against shoulder 195 in bore 196, as shown in FIG. 11.

The head assembly 131 again includes a rotor housing portion 164 and a handle connecting portion 165, with the rotor housing portion again including a rotor 166 journaled in the rotor housing by means of the stub shaft 168 received through the micro bearing 169 and the burr holder 170 received through the micro bearing 171. In this second embodiment, however, the lower wall of rotor housing portion 164 is substantially closed except for the opening 206 formed for the burr holder 170, while the upper side of the rotor housing is open for threadably receiving the cap 164a, which cap retains and positions the upper micro bearing 169.

The burr holder 170 and stub shaft 168 are again provided with axially aligned substantially equal diameter bores 173 and 174, respectively, with O-rings 172 being positioned between burr holder 170 and stub shaft 168 and extending radially inwardly to diameters smaller than the diameters of bores 173 and 174. Thus, as shown in FIG. 11, a usual dental burr 207 having the cutting end portion 208 may be received partially telescoped within bores 173 and 174 of burr holder 170 and stub shaft 168, with O-rings 172 resiliently engaging the outer periphery of burr 207 so that as rotor 166 is rotated, dental burr 207 will also be rotated.

The handle connecting portion 165 is again provided with the longitudinally extending bore 177 which communicates with the rotor housing 164 at the portion of rotor 166 containing the rotor buckets 167. Further, the nozzle holder 180 is again telescoped within bore 177 of portion 165, with holder 180 extending within portion 165 to a point spaced from rotor 166 and being retained in bore 177 preferably by means of a pin 183.

Still further, the nozzle holder 180 is again provided with the series of longitudinally extending circumferentially spaced slots 188 formed therethrough in the outer periphery thereof, and the flange 181 extending radially outwardly beyond the longitudinally extending flange 178 at the rearward end of portion 165. Also, sealing washer 182 is positioned with the inner portion thereof preferably slightly compressed between flange 181 of nozzle holder 180 and flange 178 of portion 165.

Because of the formation of slots 188 through nozzle holder 180, the flange 181 is actually only provided at the partitions between these slots, as shown in FIG. 18, and in this second embodiment, at each of these partitions, longitudinally rearwardly extending indexing tabs 209 are formed on flange 181, as best seen in FIGS. 11, 13 and 17, for a purpose to be hereinafter described. Further, these tabs 209 are preferably equally spaced.

Also, in this second embodiment, nozzle holder 180 is provided with a longitudinally extending centrally located bore extending from the rearward end of holder 180 to a point spaced from the forward end thereof, with bore 210 having a diameter somewhat larger than the outer diameter of air discharge tube 201 extending from handle assembly 130 and a diameter slightly less than the normal outer diameter of O-ring 204 mounted on tube 201. At the forward end of nozzle holder 180, this holder is provided with a smaller diameter bore 211 communicating with bore 210 and bore 177 of handle connecting portion 165, with nozzle 186 being mounted telescoped partially within bore 211 and retained therein, preferably by soldering, as at 212.

Still further, in this second embodiment, the handle connecting portion 165 is provided with an air jet hole 213 formed through the lower wall thereof into bore 177, as shown in FIG. 11. Air jet hole 213 is positioned with the longitudinal axis thereof in alignment with the cutting end portion 208 of burr 207, for a purpose to be hereinafter described.

Finally, this second embodiment again includes the collar or nut 189 having the flange 190 engaged with the outer portion of sealing washer 182 forwardly of flange 181 of nozzle holder 180, with collar 189 in the assembled dental handpiece being threadably engaged telescoped over the forward end portion 137 of handle assembly 130.

Thus, in the use of the fluid-driven handpiece construction comprising the second embodiment, air under pressure is supplied through hose 155, through the length of handle 132 and into nipple 198. The air then flows through discharge tube 201 into nozzle holder 180 and ultimately from nozzle holder 180 through nozzle 186 against the buckets 167 of rotor 166.

As the air is exhausted from rotor buckets 167, it flows into the bore 177 of handle connecting portion 165 outward of nozzle 186, where it passes through nozzle holder slots 188 rearwardly into space 162. From space 162 the air flows through pipe spacer slots 160 into the handle bore 140 outwardly of air supply hose 155.

After the air has passed rearwardly through handle 132, it flows through slots 149 into muffler assembly 133 and is ultimately exhausted through holes 150 in hose guard 134. As before described, although hose 155 is normally of a slightly smaller diameter than the restriction 193 in the hose guard bore 192, since, during the operation of the handpiece, the air under pressure within hose 155 causes this hose to expand, an air-tight seal is formed between hose 155 and restriction 193, so that all of the exhaust air is directed into muffler assembly 133.

The purpose of the slots 205 formed at the forward end of handle end portion 137 and the tabs 209 formed on the flange 181 of muffler holder 180 is to provide positive indexing between handle assembly 130 and head assembly 131. When head assembly 131 is assembled on handle assembly 130, as shown in FIGS. 11 and 13, the tabs 209 of nozzle holder 180 are received in the slots 205 in handle end portion 137.

These indexing tabs 209 and indexing slots 205 are arranged so that, despite the relative positions between handle assembly 130 and head assembly 131, as long as one of the indexing tabs 209 is aligned with a slot 205, the remainder of the indexing tabs will be aligned with slots. Thus, head assembly 131 may be rotated with reference to handle assembly 130 merely by loosening collar 189 and disengaging the indexing tabs 209 from the indexing slots 205, and once the new position has been selected, the collar 189 is again drawn up on the handle forward end portion 137 to engage the indexing tabs 209 with certain of the indexing slots 205, as best shown in FIG. 12.

Thus, positive indexing is provided between the handle assembly 130 and head assembly 131, and as long as collar 189 is drawn up on handle portion 137, even a great amount of force will not cause head assembly 131 to rotate in reference to handle assembly 130. Even though this positive indexing is provided, however, head assembly 131 may be rotated in reference to handle assembly 130 merely by loosening collar 189 in reference to handle end portion 137.

Further, in this second embodiment, a simplified air-tight, but yet rotatable, connection is provided for transmitting the air supply between handle assembly 130 and head assembly 131. The air discharge tube 201 of the handle assembly merely telescopes within the nozzle holder bore 210 of the head assembly, with the resilient O-ring 204 preventing air leakage between these two parts while still maintaining these two parts selectively rotatable.

Still further, in this second embodiment, as shown in FIG. 11, the air jet hole 213 provides cooling means for the cutting end portion 208 of the dental burr 207. Since hole 213 communicates with the bore 177 of the head assembly portion 165, and since exhaust air from rotor 166 passes through bore 177, a small amount of this exhaust air passes through hole 213 and is directed toward and strikes the cutting end portion 208 of burr 207, as illustrated by broken lines 214 in FIG. 11.

Finally, additional sound deadening characteristics are provided in this second embodiment over the construction of the first embodiment because of the air supply being transmitted through the length of handle 132 by means of the rubber or plastic air supply hose 155. Since, as before described, sound waves are created by the air striking and discharging from buckets 167 of rotor 166, and these sound waves are transmitted back through handle 132 outwardly of air supply hose 155, it is thought that because of the resilient material of which hose 155 is formed, these sound waves are somewhat broken up and distorted by striking hose 155, since the plastic or rubber material makes a poor sound reflective surface.

Thus, according to the principles of the present invention, as shown and described in one or both of the foregoing embodiments, a fluid-driven dental handpiece is provided which overcomes certain objections of the prior constructions and solves certain problems normally encountered with the provision of certain desirable features therein; in which the fluid-driven turbine is positioned at the end of the handpiece in which the burr-holding device is located; in which the exhaust fluid, preferably air, is removed to a point remote from the patient's mouth before being exhausted from the handpiece; in which the exhaust of air from the handpiece is muffled, thereby greatly decreasing the noise normally created; in which the fluid-driven turbine is formed in such a way as to eliminate the greater portion of the noise normally created in air turbines; in which the head portion thereof containing the turbine and burr-holding device is angled and is rotatable in relation to the handle portion to provide more convenient and greater accessibility to all of the teeth in the patient's mouth, yet an efficient means is provided for supplying fluid such as air through the handle portion to the turbine in the head portion; in which the head portion is angled and rotatable in relation to the handle portion and the head portion may be selectively and securely placed and maintained in any one of a series of positions in reference to the handle portion; in which cooling means is provided for the dental burr; and in which all of the above advantageous features are provided, yet the handpiece is of a minimum size, is simple and relatively economical to manufacture and is constructed for convenience of assembly.

Although the fluid-driven dental handpiece construction comprising the present invention has been shown and described specifically for use with air as the fluid driving medium, it should be understood that the principles of the improvements shown are applicable to fluid-driven dental handpiece constructions, whether the fluid driving medium is air, some other gas or a liquid. It is therefore not intended to limit the principles of the present invention to a fluid-driven dental handpiece in which the fluid driving medium is air.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction illustrated and described herein are by way of example, and the scope of the present invention is not limited to the exact details of the construction shown.

Having now described the invention, the constructions, operation and use of preferred embodiments thereof, and the advantageous new and useful results obtained thereby; the new and useful construction and reasonable mechanical equivalents thereof obvious to those skilled in the art are set forth in the appended claims.

We claim:

1. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means connecting the head member to the handle member for selectively permitting rotation of the head member in relation to the handle member and selectively retaining the head member in fixed position in relation to the handle member, fluid supply and exhaust means for supplying fluid to the turbine to rotate the turbine and for exhausting fluid from the turbine, said fluid supply and exhaust means including supply channel means extending centrally between the head and handle and opening at the turbine, the supply channel means including a longitudinally extending cylindrical pipe in one of the head members and a channel member having a longitudinally extending bore in the other of said members, connection means in the fluid supply channel means between the head and handle members for providing a fluid-tight connection when the head member is retained in a fixed position in relation to the handle member, said connection means including a conically tapered end portion on the supply channel means pipe and a conically tapered end portion in the channel member bore, and the pipe tapered end portion being received in the bore tapered end portion providing a fluid-tight connection when the head member is retained in a fixed position in relation to the handle member.

2. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means connecting the head member to the handle member for selectively permitting rotation of the head member in relation to the handle member and selectively retaining the head member in fixed position in relation to the handle member, fluid supply and exhaust means for supplying fluid to the turbine to rotate the turbine and for exhausting fluid from the turbine, said fluid supply and exhaust means including supply channel means extending centrally between the head and handle members and opening at the turbine, said supply channel means including a longitudinally extending cylindrical pipe telescoped within and extending a portion of the length of one of the head and handle members and a channel member having a longitudinally extending bore telescoped within the other of said members, connection means in the fluid supply channel means between the head and handle members for providing a fluid-tight connection when the head member is retained in a fixed position in relation to the handle member, said connection means including a conically tapered end portion on said pipe and a conically tapered end portion in said channel member bore and said pipe tapered end portion being received in said bore tapered end portion with the pipe being flexed to exert pressure between said end portions when the head member is retained in a fixed position in relation to the handle member.

3. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means connecting the head member to the handle member for selectively permitting rotation of the head member in relation to the handle member and selectively retaining the head member in fixed position in relation to the handle member, fluid supply and exhaust means for supplying fluid to the turbine to rotate the turbine and for exhausting fluid from the turbine, said fluid supply and exhaust means including supply channel means extending centrally between the head and handle members and opening at the turbine, said supply channel means including a longitudinally extending cylindrical pipe in one of the head and handle members and a channel member having a longitudinally extending bore in the other of said members, connection means in the fluid supply channel means between the head and handle members for providing a fluid-tight connection when the head member is retained in a fixed position in relation to the handle member, said connection means including a resilient O-ring surrounding a portion of the pipe, and said pipe being telescoped within said channel member bore with the O-ring engaging the channel member within said bore when the head member is retained in fixed position in relation to the handle member.

4. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means connecting the head member to the handle member for selectively permitting rotation of the head member in relation to the handle member and selectively retaining the head member in fixed position in relation to the handle member, fluid supply aand exhaust means for supplying fluid to the turbine to rotate the turbine and for exhausting fluid from the turbine, said fluid supply and exhaust means including supply channel means extending centrally between the head and handle members and substantially the entire length of said members and opening at the turbine, said supply channel means including a longitudinally extending cylindrical pipe telescoped within and extending a portion of the length of one of the head and handle members and a channel member having a longitudinally extending bore telescoped within the other of said members, connection means in the supply channel means between the head and handle members for providing a fluid-tight connection when the head member is retained in a fixed position in relation to the handle member, said connection means including a conically tapered end portion on said pipe and a conically tapered end portion in said channel member bore, said pipe tapered end portion being received in the bore tapered end portion with the pipe being flexed to exert pressure between said end portions when the head member is retained in a fixed position in relation to the handle member, said fluid supply and exhaust means including exhaust channel means substantially surrounding the fluid supply channel means and extending from the turbine through the head member and at least a portion of the handle member, and sealing means for preventing fluid leakage from the exhaust channel means between the head and handle members when the head member is retained in fixed position in relation to the handle member.

5. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means connecting the head member to the handle member for selectively permitting rotation of the head member in relation to the handle member and selectively retaining the head member in fixed position in relation to the handle member, fluid supply and exhaust means for supplying fluid to the turbine to rotate the turbine and for exhausting fluid from the turbine, said fluid supply and exhaust means including supply channel means extending centrally between the head and handle members and substantially the entire length of said members and opening at the turbine, said fluid supply and exhaust means including exhaust channel means substantially surrounding the fluid supply channel means and extending from the turbine through the head member and at least a portion of the handle member, connection means in the supply channel means between the head and handle members for providing a fluid-tight connection when the head member is retained in a fixed position in relation to the handle member, sealing means for preventing fluid leakage from the exhaust channel means between the head and handle members when the head member is retained in fixed position in relation to the handle member, the supply channel means including a resilient supply tube extending longitudinally through at least a portion of the handle member and telescoped within the exhaust channel means, the handle member having a rearward end portion spaced rearwardly from the head member, said handle member rearward end portion having a bore formed therein opening into the exhaust channel means, the supply tube being positioned entering the handle and the exhaust channel means through said end portion bore, muffler means mounted on the handle member in communication with the exhaust channel means forwardly of said rearward end portion bore for deadening sound waves created by fluid striking the turbine and being transmitted through the head and handle members by the exhaust channel means, and restriction means in the rearward end portion bore for engaging the supply tube when fluid under pressure is contained within and slightly expands the supply tube so that a fluid-tight seal is provided between the handle member rearward end portion and the supply tube.

6. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means connecting the head member to the handle member for selectively permitting rotation of the head member in relation to the handle member and selectively retaining the head member in fixed position in relation to the handle member, fluid supply and exhaust means for supplying fluid to the turbine to rotate the turbine and for exhausting fluid from the turbine, said fluid supply and exhaust means including supply channel means extending centrally between the head and handle members and substantially the entire length of said members and opening at the turbine, said fluid supply and exhaust means including exhaust channel means and extending from the turbine through the head member and at least a portion of the handle member, connection means in the supply channel means between the head and handle members for providing a fluid-tight connection when the head member is retained in a fixed position in relation to the handle member, said supply channel means including a longitudinally extending cylindrical pipe in one of the head and handle members and a channel member having a longitudinally extending bore in the other of said members, said connection means including a resilient O-ring surrounding a portion of the pipe, said pipe being telescoped within said channel member bore with the O-ring engaging the channel member within said bore when the head member is retained in fixed position in relation to the handle member, and sealing means for preventing fluid leakage from the exhaust channel means between the head and handle members when the head member is retained in fixed position in relation to the handle member.

7. Fluid-driven dental handpiece construction including an elongated handle member, a head member, the handle and head members having connecting ends with the handle member connecting end being positioned adjacent the head member connecting end, a fluid turbine rotatably mounted in the head member spaced from the head member connecting end, a burr holder operably connected to the turbine for holding and rotating a dental burr upon rotation of the turbine, the handle member having an axially extending bore formed therein at least at the handle member connecting end, the head member having an axially extending bore formed therein between the head member connecting end and the turbine, a connection member having a series of circumferentially spaced axially extending tabs formed thereon, said tabs extending radially outwardly from said connection member, one of the handle and head members having an outer surface extending from said one member connecting end, said connection member being received in said one member bore with the tabs adjacent said one member connecting end and projecting radially outwardly of the outer surface on said one member, a collar member having a radially inwardly extending flange mounted surrounding the connection member tabs with said inwardly extending flange surrounding said one member outer surface and engaged with the connection member tabs, the other of said handle and head members having circumferentially spaced axially extending slots formed on said other member connecting end opening toward said one member connecting end, said tabs being engaged in certain of said other member slots with the collar member being threadably engaged with said other member retaining the handle and head members in fixed position with relation to each other, said tabs and said slots being uniformly spaced so that said tabs and said slots are selectively engageable in a series of axially aligned positions of the handle and head members, the handle and head members being axially rotatable and axially repositionable in different axially aligned positions with respect to each other upon loosening of said threaded engagement between the collar member and said other member and disengagement of said tabs from said slots, fluid supply means for supplying fluid to the turbine to rotate the turbine, fluid exhaust means for exhausting fluid from the turbine, the fluid supply means and exhaust means each including fluid passage means through the connection member and between the handle and head members for transmitting supply fluid from the handle member to the head member to rotate the turbine and for transmitting exhaust fluid from the head member to the handle member, the fluid supply means and exhaust means extending through the connection member and between the handle and head members despite the particular axially aligned position of the handle and head members, and the collar member co-operating with the connection member and head member to provide a substantially fluid-tight joint between the handle and head members surrounding the fluid supply means and exhaust means.

8. Fluid-driven dental handpiece construction including an elongated handle member, a head member, the handle and head members having connecting ends with the handle member connecting end being positioned adjacent the head member connecting end, a fluid turbine rotatably mounted in the head member spaced from the head member connecting end, a burr holder operably connected to the turbine for holding and rotating a dental burr upon rotation of the turbine, the handle member having an axially extending bore formed therein at least at the handle member connecting end, the head member having an axially extending bore formed therein between the head member connecting end and the turbine, a connection member having a series of circumferentially spaced axially extending tabs formed thereon, said tabs extending radially outwardly from said connection member, the head member having an outer surface extending from the head member connecting end, said connection member being received in the head member bore with the tabs adjacent said head member bore with the tabs adjacent said head member connecting end and projecting radially outwardly of said head member outer surface, a collar member having a radially inwardly extending flange mounted surrounding the connection member tabs with said inwardly extending flange surrounding the head member outer surface and engaged with the connection member tabs, the handle member having circumferentially spaced axially extending slots formed on the handle connecting end opening toward the head member connecting end, said tabs being engaged in certain of the connection member slots with the collar member being threadably engaged with the handle member retaining the handle and head members in fixed position with relation to each other, said tabs and said slots being uniformly spaced so that said tabs and said slots are selectively engageable in a series of axially aligned positions of the handle and head members, the handle and head members being axially and rotatable and axially repositionable in a different axially aligned position with respect to each other upon loosening of said threaded engagement between the collar member and handle member and disengagement of said tabs from said slots, fluid supply means for supplying fluid to the turbine to rotate the turbine, fluid exhaust means for exhausting fluid from the turbine, said fluid supply means and exhaust means each including fluid passage means through said connection member and between the handle and head members for transmitting supply fluid from the handle member to the head member to rotate the turbine and for transmitting exhaust fluid from the head member to the handle member, said fluid supply means and exhaust means extending through the connection member and between the handle and head members despite the particular axially aligned position of the handle and head members, the collar member co-operating with the connection member and handle member and head member to provide a substantially fluid-tight joint between the handle and head members surrounding the fluid supply means and exhaust means, the connection member including nozzle means communicating with said fluid supply means fluid passage means, and the nozzle means opening adjacent the turbine for directing supply fluid toward the turbine to rotate the same.

9. Fluid-driven dental handpiece construction including an elongated handle member, a head member, the handle and head members having connecting ends with the handle member connecting end being positioned adjacent the head member connecting end, a fluid turbine rotatably mounted in the head member spaced from the head member connecting end, a burr holder operably connected to the turbine for holding and rotating a dental burr upon rotation of the turbine, the handle member having an axially extending bore formed therein at least at the handle member connecting end, the head member having an axially extending bore formed therein between the head member connecting end and the turbine, a connection having radially outwardly extending flange means, one of the handle and head members having an outer surface extending from said one member connecting end, said connection member being received in said one member bore with the flange means adjacent said one member connecting end and projecting radially outwardly of said outer surface on said one member, a collar member having a radially inwardly extending flange mounted surrounding the connection member flange means with said inwardly extending flange surrounding said one member outer surface and engaged with the connection member flange means, the collar member being threadably engaged with said other member retaining the handle and head members in fixed position with relation to each other, the handle and head members being axially rotatable and axially repositionable in a different axially aligned position with respect to each other upon loosening of said threaded engagement between the collar member and said other member, fluid supply means for supplying fluid to the turbine to rotate the turbine, fluid exhaust means for exhausting fluid from the turbine, said fluid supply means and exhaust means each including fluid passage means through said connection member and between the handle and head members for transmitting supply fluid from the handle member to the head member to rotate the turbine and for transmitting exhaust fluid from the head member to the handle member, said fluid supply means and exhaust means extending through the connection member and between the handle and head members despite the particular axially aligned position of the handle and head members, and the collar member cooperating with the connection member and handle member and head member to provide a substantially fluid-tight joint between the handle and head members surrounding the fluid supply means and exhaust means.

10. Fluid-driven dental handpiece construction including an elongated handle member, a head member, the handle and head members having connecting ends with the handle member connecting end being positioned adjacent the head member connecting end, a fluid turbine rotatably mounted in the head member spaced from the head member connecting end, a burr holder operably connected to the turbine for holding and rotating a dental burr upon rotation of the turbine, the handle member having an axially extending bore formed therein at least at the handle member connecting end, the head member having an axially extending bore formed therein between the head member connecting end and the turbine, a connection member having radially outwardly extending flange means, the head member having an outer surface extending from the head member connecting end, said connection member being received in the head member bore with the flange means adjacent the head member connecting end and projecting radially outwardly of the head member outer surface, a collar member having a radially inwardly extending flange mounted surrounding the connection member flange means with said inwardly extending flange surrounding the head member outer surface and being engaged with the connection member flange means, the collar member being threadably engaged with the handle member retaining the handle and head members in fixed position with relation to each other, the handle and head members being axially rotatable and axially repositionable in a different axially aligned position with respect to each other upon loosening of said threaded engagement between the collar member and the handle member, fluid supply means for supplying fluid to the turbine to rotate the turbine, fluid exhaust means for exhausting fluid from the turbine, said fluid supply means and exhaust means each including fluid passage means through the connection member and between the handle and head members for transmitting supply fluid from the handle member to the head member to rotate the turbine and for transmitting exhaust fluid from the head member to the handle member, said fluid supply means and exhaust means extending through the connection member and between the handle and head members despite the particular axially aligned position of the handle and head members, the collar member cooperating with the connection member and handle member and head member to provide a substantially fluid-tight joint between the handle and head members surrounding the fluid supply means and exhaust means, the connection member including nozzle means connecting with said fluid supply means fluid passage means, and the nozzle means opening adjacent the turbine for directing supply fluid toward the turbine to rotate the same.

11. Fluid-driven dental handpiece construction including an elongated handle member, a head member, a fluid turbine rotatably mounted in the head member, a burr holder operably connected to the turbine for holding and rotating a dental burr upon rotation of the turbine, adjustable means for connecting the head member to the handle member for selectively permitting rotation of the head member in relation to the handle member and selectively retaining the head member in fixed position in relation to the handle member, fluid supply and exhaust means for supplying fluid to the turbine to rotate the turbine and for exhausting fluid from the turbine, said fluid supply and exhaust means including supply channel means extending centrally between the head and handle members and substantially the entire length of said members and opening at the turbine, said fluid supply and exhaust means including exhaust channel means substantially surrounding the fluid supply channel means and extending from the turbine through the head member and at least a portion of the handle member, connection means in the supply channel means between the head and handle members for providing a fluid-tight connection when the head member is retained in a fixed position in relation to the handle member, sealing means for preventing fluid leakage from the exhaust channel means between the head and handle members when the head member is retained in fixed position in relation to the handle member, and muffler means mounted on the handle member in communication with the exhaust channel means for deadening sound waves created by fluid striking the turbine and being transmitted through the head and handle members by the exhaust channel means.

12. Fluid-driven dental handpiece construction as defined in claim 11 in which the adjustable means includes a collar rotatably engaged with one of the head and handle members and threadably engaged with the other of said members; and in which the sealing means includes a sealing washer between the collar and said one member.

13. Fluid-driven dental handpiece construction as defined in claim 12 in which the supply channel means includes a longitudinally extending cylindrical pipe telescoped within and extending a portion of the length of one of the head and handle members and a channel member having a longitudinally extending bore telescoped within the other of said members; in which the connection means includes a conically tapered end portion in the channel member bore; and in which the pipe tapered end portion is received in the bore tapered end portion and the pipe is flexed to exert pressure between said end portions when the head member is retained in a fixed position in relation to the handle member.

14. Fluid-driven dental handpiece construction as defined in claim 12 in which the supply channel means includes a longitudinally extending cylindrical pipe in one of the head and handle members and a channel member having a longitudinally extending bore in the other of said members; in which the connection means includes a resilient O-ring surrounding a portion of the pipe; in which the pipe is telescoped within the channel member bore and the O-ring engages the channel member within said bore when the head member is retained in fixed position in relation to the handle member; in which one of the head and handle members has a series of circumferentially spaced longitudinally extending slots formed therein, and said slots open toward the other of said members; in which a series of circumferentially spaced longitudinally extending tabs are mounted on the other of said members and extending toward said one member; in which the tabs are engaged in certain of the slots when the adjustable means connects the head member to the handle member for retaining the head member in fixed position in relation to the handle member; in which the supply channel means includes a resilient supply tube extending longitudinally through at least a portion of the handle member and telescoped within the exhaust channel means; in which the handle member has a rearward end portion spaced rearwardly from the head member; in which the handle member rearward end portion has a bore formed therein opening into the exhaust channel means; in which the supply tube enters the handle and the exhaust channel means through said end portion bore; in which muffler means is mounted on the handle member in communication with the exhaust channel means forwardly of the rearward end portion bore for deadening sound waves created by fluid striking the turbine and being transmitted through the head and handle members by the exhaust channel means; and restriction means in the handle member rearward end portion bore for engaging the supply tube when fluid under pressure is contained within and slightly expands the supply tube, whereby a fluid-tight seal is provided between the handle member rearward end portion and the supply tube.

15. Fluid-driven dental handpiece construction including an elongated handle member, a head member connected to the handle member, a fluid turbine rotatably mounted in the head member, a burr holder operably connected to the turbine for holding and rotating a dental burr upon rotation of the turbine, fluid supply and exhaust means for supplying fluid to the turbine to rotate the turbine and for exhausting fluid from the turbine, said fluid supply and exhaust means including exhaust channel means extending from the turbine through the head member and at least a portion of the handle member, spaced opening means formed through the handle member communicating with the exhaust channel means, a muffler housing telescoped over the handle member spaced from the head member and overlying the opening means, and muffling material means in the muffler housing forming restricted passage means extending from the exhaust channel means through the opening means and through the muffling material means for exhausting fluid from the exhaust channel means and deadening sound waves created by the fluid striking the turbine and being transmitted through the head and handle members by the fluid exhaust channel means.

References Cited in the file of this patent

UNITED STATES PATENTS

| | | |
|---|---|---|
| 1,534,721 | Lasche | Apr. 21, 1925 |
| 1,740,796 | Terry | Dec. 24, 1929 |
| 2,073,480 | Jimerson | Mar. 9, 1937 |
| 2,128,742 | Fuehrer | Aug. 30, 1938 |
| 2,157,115 | Cornell | May 9, 1939 |
| 2,283,314 | Ckola | May 19, 1942 |
| 2,664,632 | Norlen | Jan. 5, 1954 |

FOREIGN PATENTS

| | | |
|---|---|---|
| 163,217 | Austria | Oct. 15, 1948 |
| 157,349 | Australia | June 19, 1952 |

OTHER REFERENCES

Nelson et al.: Article, "Hydraulic turbine contra-angle handpiece," J. A. Dent. Assoc., vol. 47, September 1953, pp. 324–329. (Copy in 32—27.)